(12) United States Patent
Ramamoorthy

(10) Patent No.: US 9,431,884 B2
(45) Date of Patent: Aug. 30, 2016

(54) DUAL ROTOR SWITCHED RELUCTANCE MACHINE

(71) Applicant: Caterpillar Inc., Peoria, IL (US)

(72) Inventor: Krishnakumar D. Ramamoorthy, Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 685 days.

(21) Appl. No.: 13/850,673

(22) Filed: Mar. 26, 2013

(65) Prior Publication Data
US 2014/0292131 A1    Oct. 2, 2014

(51) Int. Cl.
*H02K 16/02*    (2006.01)
*H02K 51/00*    (2006.01)

(52) U.S. Cl.
CPC ............... *H02K 16/02* (2013.01); *H02K 51/00* (2013.01)

(58) Field of Classification Search
CPC ............................ H02K 16/02; H02K 51/00
USPC .............................................. 310/114, 156.37
See application file for complete search history.

(56) References Cited

U.S. PATENT DOCUMENTS

| | | | | |
|---|---|---|---|---|
| 5,633,555 A * | 5/1997 | Ackermann | ......... | H02K 49/106 310/103 |
| 7,591,748 B2 | 9/2009 | Holmes | | |
| 7,956,504 B2 * | 6/2011 | Quere | ........... | H02K 7/116 310/114 |
| 8,169,116 B2 * | 5/2012 | Oya | ........... | H02K 16/02 310/112 |
| 8,232,701 B2 * | 7/2012 | Kasaoka | ......... | H02K 21/14 310/112 |
| 2002/0047418 A1 * | 4/2002 | Seguchi | .......... | F02N 11/04 310/114 |
| 2003/0201647 A1 * | 10/2003 | Makino | ......... | F03D 1/00 290/55 |
| 2006/0249319 A1 | 11/2006 | Hoare et al. | | |
| 2008/0283331 A1 * | 11/2008 | Higashi | ........... | B62D 5/0403 180/444 |
| 2010/0123426 A1 * | 5/2010 | Nashiki | ......... | H02K 1/12 318/701 |
| 2010/0308674 A1 * | 12/2010 | Kasaoka | ........ | H02K 21/14 310/114 |

(Continued)

FOREIGN PATENT DOCUMENTS

| | | |
|---|---|---|
| EP | 1465326 A2 | 6/2004 |
| JP | 2003299326 A * | 10/2003 |
| JP | 2003299327 A * | 10/2003 |
| JP | 2004090068 A | 3/2004 |
| WO | WO 00/34066 | 6/2000 |

OTHER PUBLICATIONS

"Baseline Electric Drive System", Presentation Figure, publicly available and known at least as early as prior to the Mar. 26, 2013 filing date of U.S. Appl. No. 13/850,673.

(Continued)

*Primary Examiner* — Alex W Mok
(74) *Attorney, Agent, or Firm* — Miller, Matthias & Hull LLP; William R. Tinker

(57) ABSTRACT

A dual rotor switched reluctance machine with a fixed stator and separate input and output rotors on either side of the fixed stator is used to transmit power between a power source such as an gas engine and a mechanical drive unit such as wheels or tracks. A switched reluctance motor configuration, such as a 6/4 motor can be combined with a with a higher pole count switched reluctance generator to allow simultaneous operation of the dual rotor machine as both a generator and a motor. Because the fixed stator has the only set of windings the control electronics are greatly simplified over separate motor-generator configurations.

18 Claims, 13 Drawing Sheets

(56) References Cited

U.S. PATENT DOCUMENTS

2011/0001364 A1* 1/2011 Oya .................. H02K 16/02
                                                310/12.15
2011/0037333 A1* 2/2011 Atallah ............... H02K 51/00
                                                310/98
2012/0306298 A1* 12/2012 Kim .................. H02K 1/141
                                                310/46

OTHER PUBLICATIONS

"Switched reluctance motor", Web Page [online]. Wikipedia.org, [available & published online at least as early as Dec. 15, 2009 <URL:https://web.archive.org/web/20100206011549/http://en.wikipedia.org/wiki/Switched_reluctance_motor]. Pages which cause document to be listed: pp. 1-4.

* cited by examiner

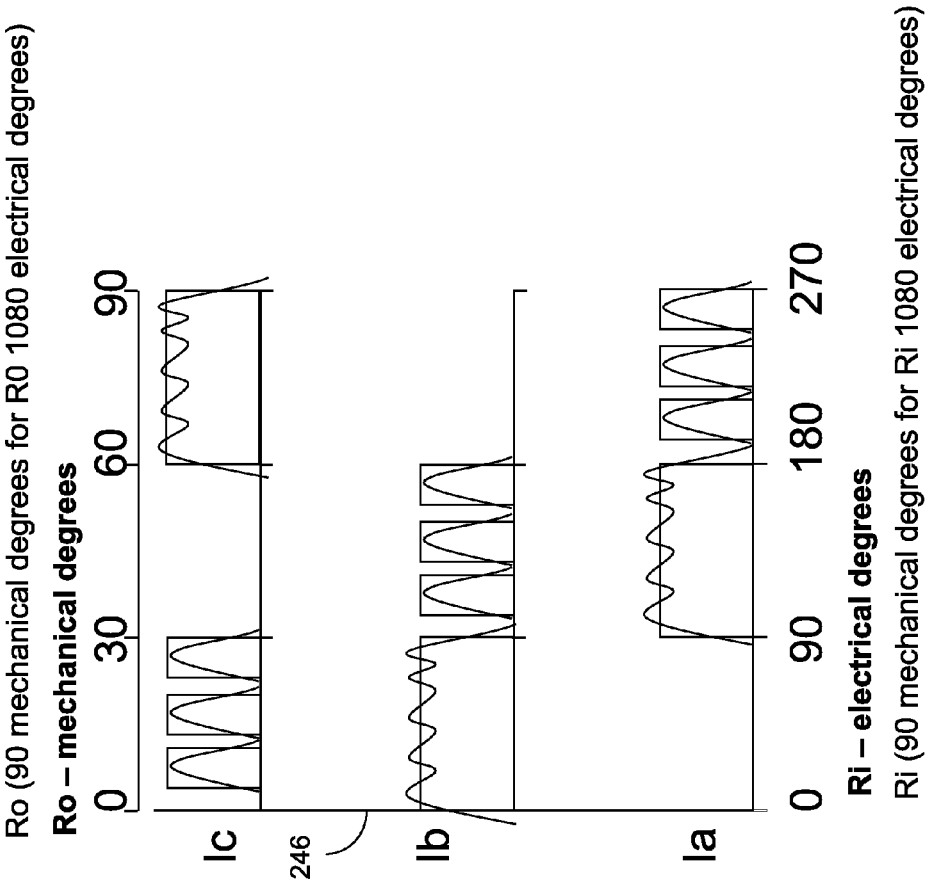
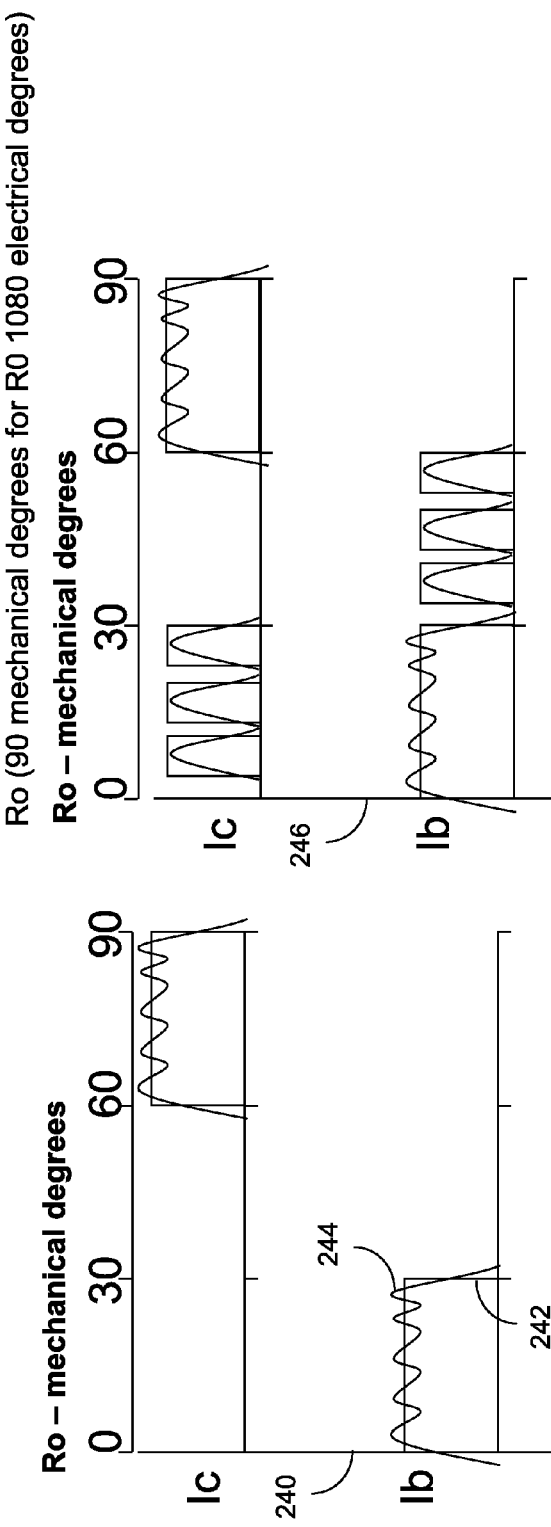
Fig. 8
Prior art
Fig. 9

Quadrant 1 – Forward and Accelerating

Quadrant 1 – Forward and Accelerating

Quadrant 4 – Reverse and Decelerating

Quadrant 4 – Reverse and Decelerating

DUAL ROTOR SWITCHED RELUCTANCE MACHINE

TECHNICAL FIELD

The present disclosure relates to a propulsion system for a vehicle and more particularly to a continuously variable transmission using a dual rotor switched reluctance machine.

BACKGROUND

Internal combustion engines can be used to power a generator and create electric energy which is stored and in turn drives an electric motor to propel a vehicle. This technique has been used effectively in vehicles such as locomotives and hybrid automobiles. Typically this process involves a generator that produces AC power. The AC power can be converted to DC power using, in some cases using a rectifier, but more popularly uses an AC-DC converter. The DC power can then be stored and a DC-AC inverter can be used to supply 3-phase power to an AC motor used to drive the vehicle.

This arrangement, while relatively efficient, has several drawbacks. One involves the cost of the high power components used in the AC-DC converter and the DC-AC inverter. Another is the loss of inertia provided by the flywheel of a standard engine-clutch-transmission drivetrain that allows smoother performance in the event of momentary engine power changes.

WO0034066 ("the '066 patent") discloses a dual rotor machine with a stator surrounding an output rotor and an input rotor surrounded by the output rotor. The stator and input rotor each have windings, the output rotor has embedded permanent magnets that interact with fields generated at the stator and input rotor. The input rotor requires slip rings to carry current to the input rotor windings. The permanent magnets of the '066 patent impose a substantial cost penalty on the system. The slip rings of the '066 patent also have a cost impact due to the elaborate construction requirements and also create a reliability weakness at the contacts between the slip rings and the shaft.

SUMMARY OF THE DISCLOSURE

In a first aspect, an energy conversion machine has a stator having a cylindrical shape with an inner circumference and an outer circumference. The stator is fixedly mounted and has poles extending radially between the inner circumference and the outer circumference. Each pole has an electrical winding. The energy conversion machine also includes an input rotor rotatably mounted adjacent to one circumference of the stator, such as an outer circumference of the stator. The input rotor is free of windings and may be free of permanent magnets other than magnets used for position sensing. The energy conversion machine can also include an output rotor rotatably mounted adjacent to the other circumference of the stator, for example, an inner circumference. The output rotor is also be free of windings and permanent magnets. The energy conversion machine also includes a controller that selectively energizes the stator electrical windings to transfer torque developed between the input rotor and the stator to the output rotor.

In another aspect, a method of converting energy from a power source to a mechanical load can include providing a switched reluctance machine with a first rotor and a second rotor, each rotor overlapping a stator, the stator having a cylindrical shape and fixedly mounted with respect to the first rotor and the second rotor, receiving power from the power source at the first rotor, and energizing a first stator pole during a stoke angle of the second rotor. Concurrent with the energizing of the first stator pole, the method can include energizing a second stator pole once for each pole of the first rotor that passes the second stator pole, the second stator pole adjacent to the first stator pole and transmitting torque to the mechanical load via the second rotor.

In yet another aspect, a system for propelling a vehicle can include an engine and an energy conversion machine having an input rotor coupled to the engine and an output rotor. The energy conversion machine can also include a stator having a cylindrical shape with an inner circumference and an outer circumference, the stator fixedly mounted and having stator poles extending between the inner circumference and the outer circumference, with each pole having an electrical winding. The input rotor can be rotatably mounted adjacent to one circumference of the stator, the input rotor free of windings and permanent magnets other than position sensing magnets. The output rotor can be rotatably mounted adjacent to the other circumference of the stator, the output rotor being free of windings and permanent magnets other than position sensing magnets. The energy conversion machine can also include a controller that selectively energizes the stator electrical windings to transfer torque developed between the input rotor and the stator to the output rotor. The system can include a driveshaft coupled to the output rotor and a propulsion device that converts torque from the output rotor received via the driveshaft to propel the vehicle.

BRIEF DESCRIPTION OF THE DRAWINGS

FIG. 8 is a prior art control diagram for a switched reluctance motor;

FIG. 9 is a control diagram for the dual rotor machine;

DETAILED DESCRIPTION

Figure 1:
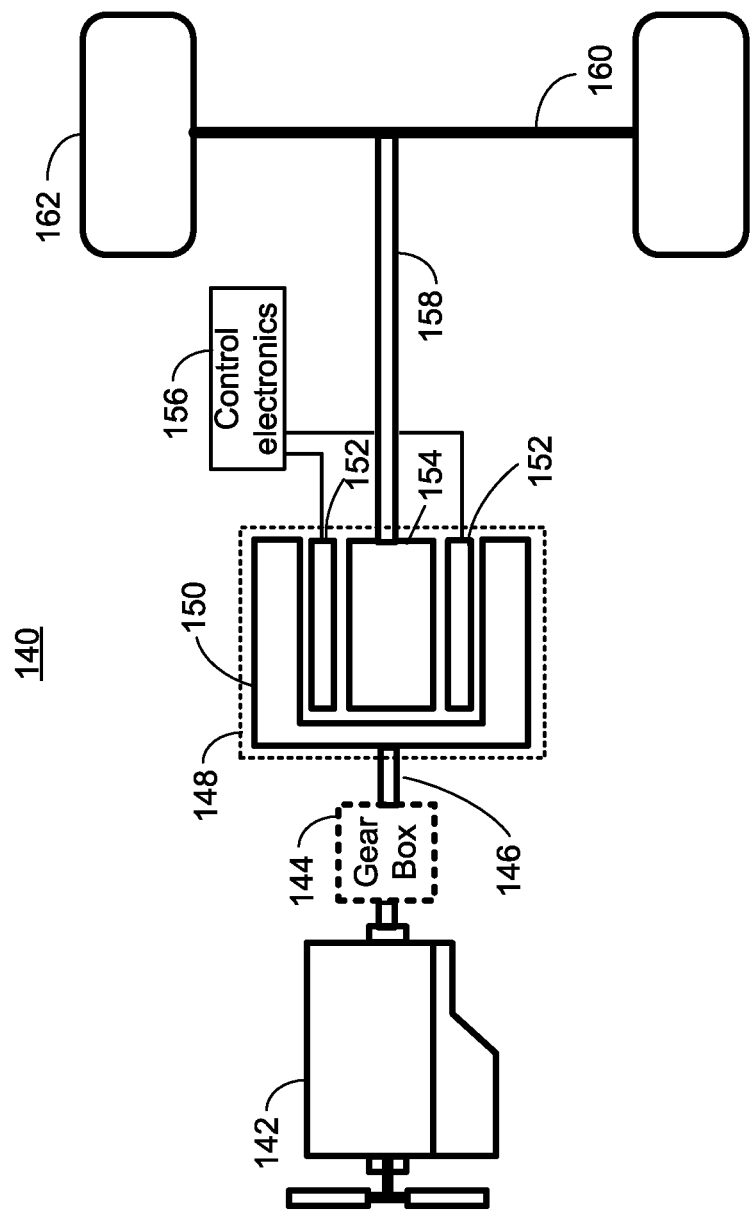
FIG. 1 is an illustration of a simplified and exemplary vehicle in accordance with the current disclosure.

FIG. 1 illustrates a vehicle 140 powered by an engine 142, a gear box 144 and a driveshaft 146, similar to the vehicle shown in FIG. 1. In some embodiments, the gear box 144 may not be used. A dual rotor machine 148 can include an input rotor 150 coupled to the drive shaft 146, a stator 152, an output rotor 154, and control electronics 156 used to time energizing pole windings in the stator 152. The output rotor 154 can be coupled to a driveshaft 158, and in prior-art fashion transmit torque via axle 160 and propulsion device 162.

Figure 2:
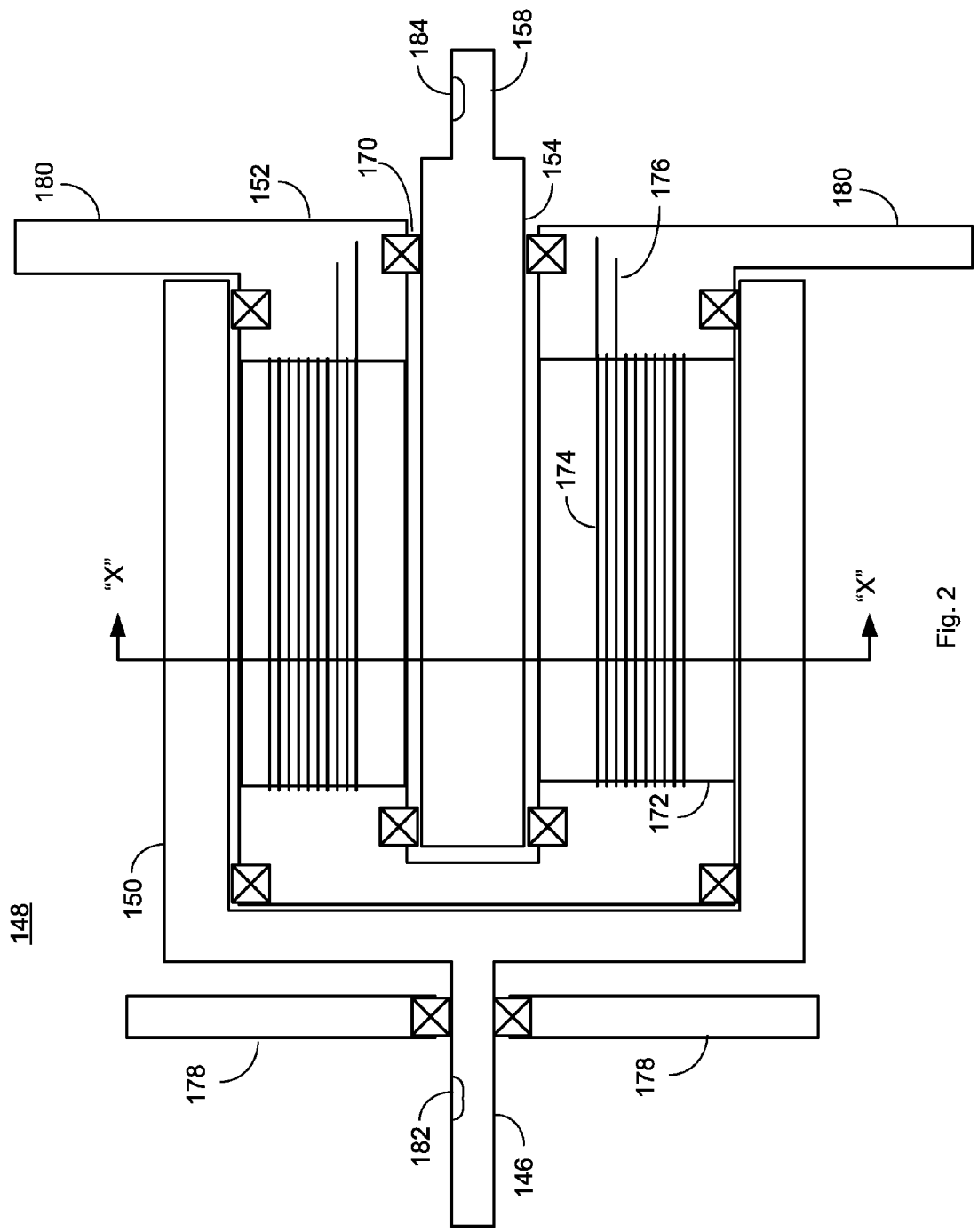
FIG. 2 is a cutaway view of a dual rotor machine.

FIG. 2 is a cutaway view of an embodiment of a dual rotor machine 148, also known as a dual rotor switched reluctance machine. The dual rotor machine 148 can include, as discussed above, an input rotor 150, an output rotor 154, and a stator 152. The input rotor 150 can be coupled to the driveshaft 146 so as to receive power from or return power to the engine 142. The output rotor 154 can be coupled to the driveshaft 158. Bearings, such as bearing 170, may be used to support rotating devices. For example, the driveshaft 146 may be supported by mounts 178 and associated bearings.

The stator 152 can be mounted by supports 180 and provide support to both the input rotor 150 and the output rotor 154 via respective bearings. As will be appreciated, numerous variations exist for providing the mechanical mounting between the stator and the two rotors.

As will be discussed in more detail below, the stator 152 includes numerous poles 172 having windings 174 that can be coupled to the control electronics 156 via leads 176. The dual rotor machine 148 can also include an input rotor position sensor 182 and an output rotor position sensor 184. The actual location and construction of the sensors 182 and 184 may vary in known fashion but can include optical or Hall Effect sensors and may be used by the control electronics 156 to determine the position of input rotor poles and output rotor poles with respect to stator poles.

Figure 3:
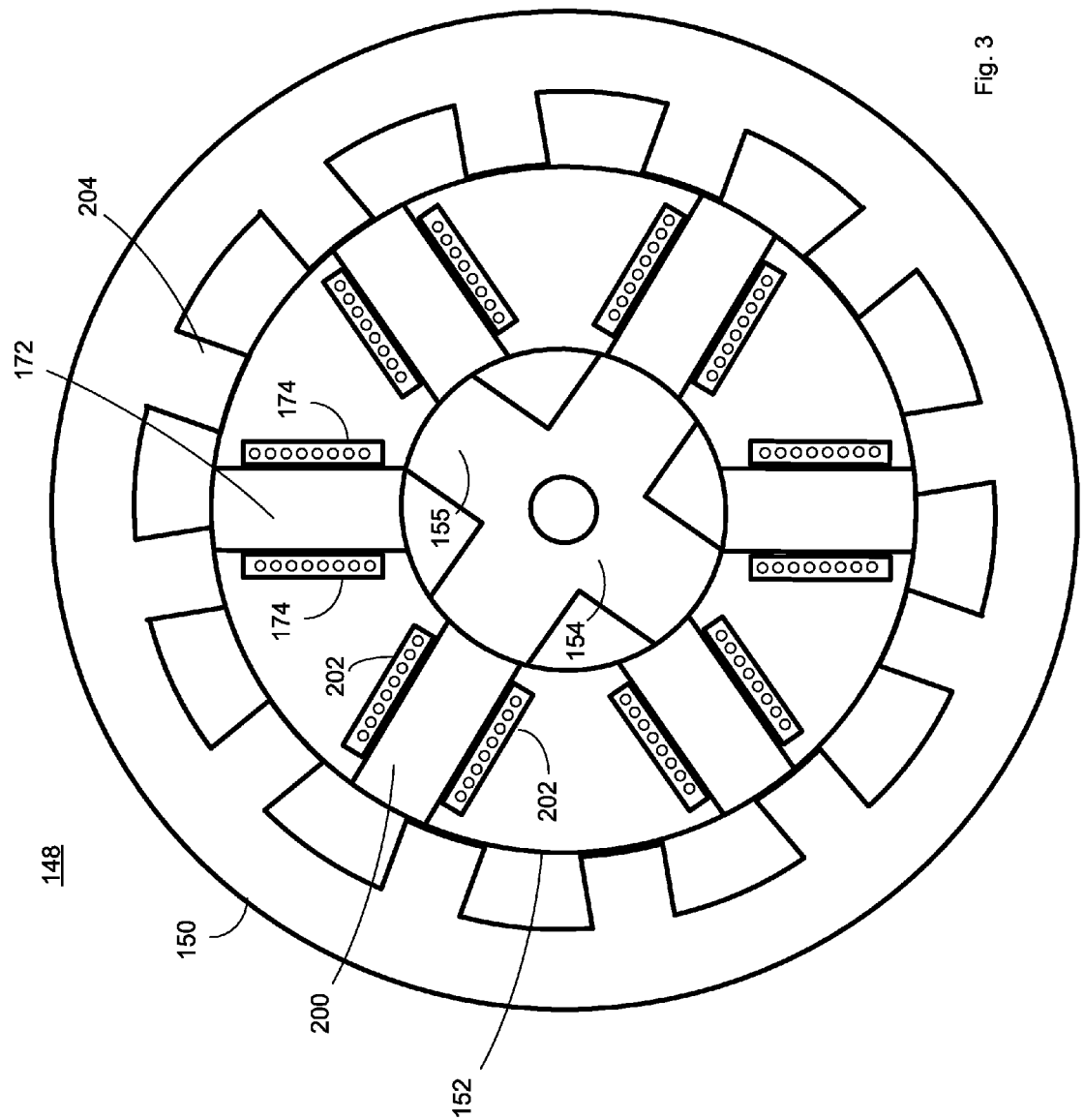
FIG. 3 is a cross-section view of the dual rotor machine.

FIG. 3 is a cross-section view of the dual rotor machine 148 shown at view 'X' of FIG. 3. This view shows the input rotor 150, the stator 152, and the output rotor 154. This view also shows a first stator pole 172 and corresponding windings 174 as well as a second stator pole 200 and its corresponding windings 202. Also illustrated is one of a plurality of input rotor poles 204. In this exemplary embodiment, the input rotor has 12 poles, the stator 152 has six poles, and the output rotor 154 has four poles. In common fashion, opposite stator poles are energized concurrently, so in the following discussions only the upper half of the dual rotor machine 148 are discussed.

Other configurations of poles are also viable. Further, the input and output rotors may be reversed so that the input rotor is along an inner circumference of the stator 152 and the output rotor is mounted along an outer circumference of the stator 152. These alternate configurations are enabled as long as the relationship between input rotor and output rotor timing with respect to the stator 152 discussed below is preserved.

Figure 4:
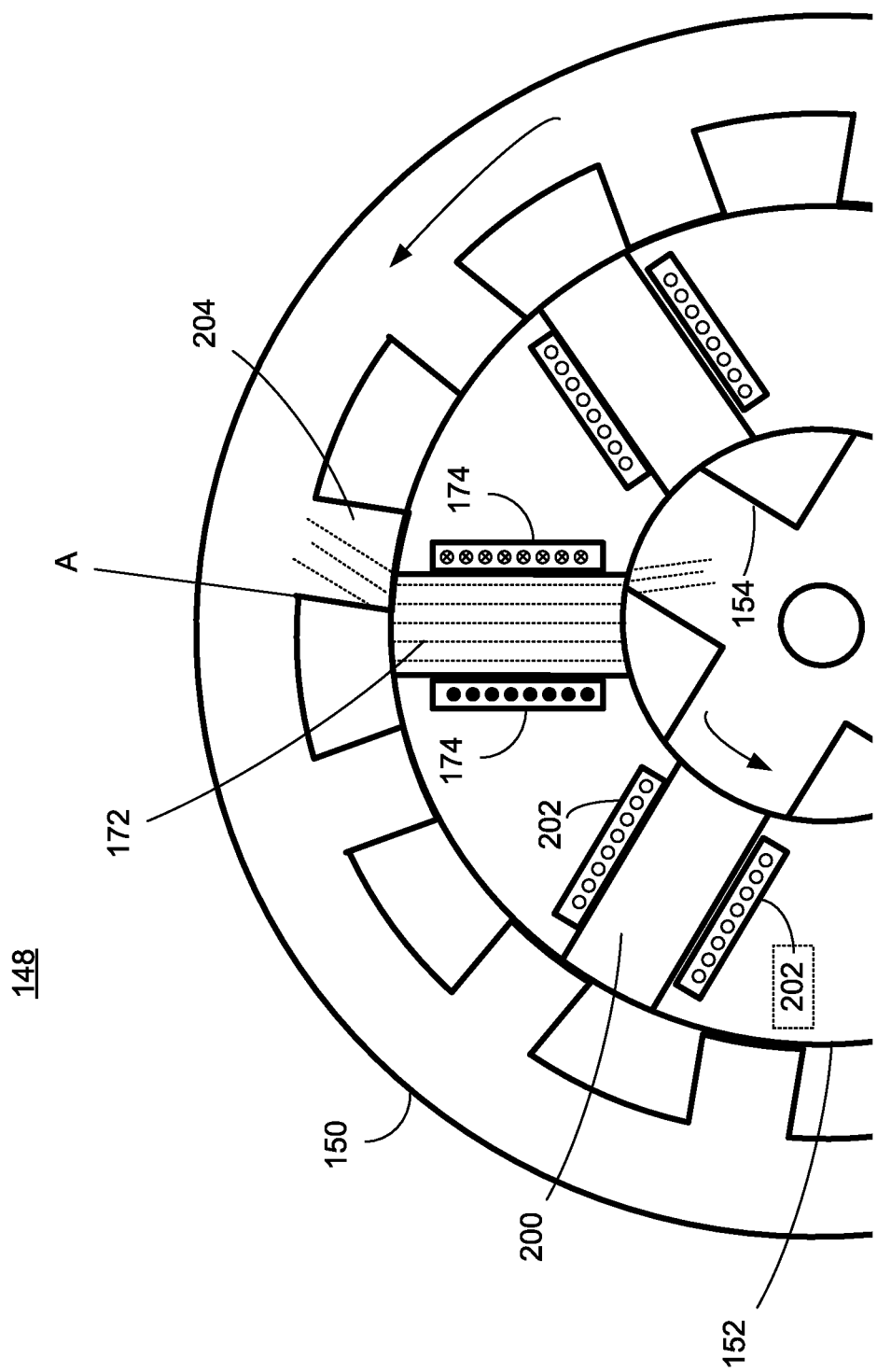
FIG. 4 is a cross-section view of the dual rotor machine depicting activation of a stator pole.
Figure 5:
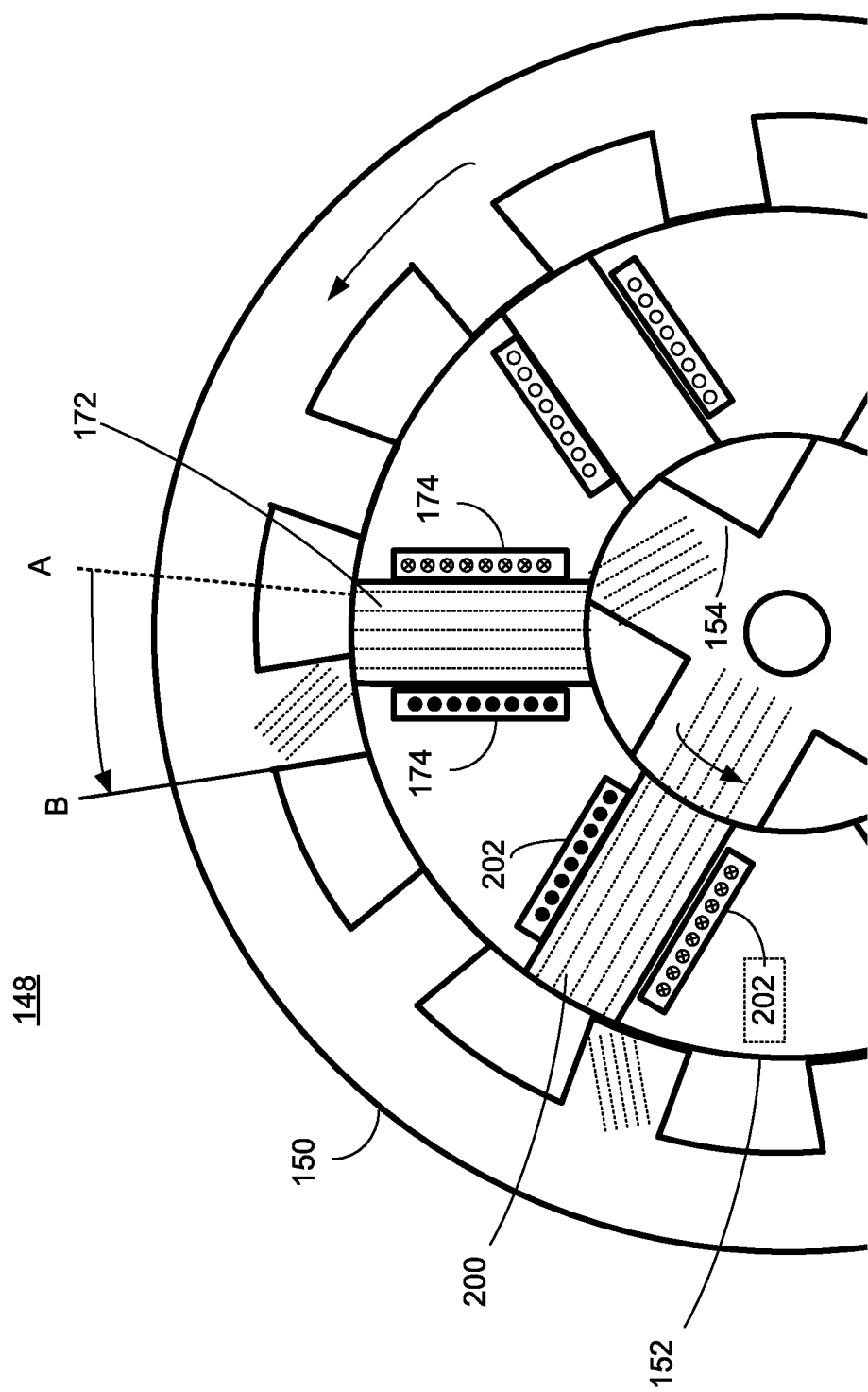
FIG. 5 is a cross-section view of the dual rotor machine depicting activation of adjacent stator poles.

FIG. 4 and FIG. 5 depict in simplified fashion operation of the dual rotor machine 148 at two points of time in an operating sequence. This operation is in so-called Quadrant 1, that is forward direction and accelerating. Other quadrants include Quadrant 2, forward operation/decelerating, Quadrant 3, reverse operation/accelerating, and Quadrant 4, reverse operation/decelerating.

FIG. 4 illustrates the dual rotor machine 148 with a first stator 172 having its windings 174 energized. In this example, both rotors are rotating counterclockwise. As the windings 174 of the first stator 172 are energized, the outer, or input rotor pole 204 is pulled toward the stator pole 172. The adjacent poles are inactive. In an embodiment this represents an input torque of about 2.0 KiloNewton-meters (KNm). Similarly, the output rotor 154 is pulled toward the stator 172 with a torque of about 1.6 KNm.

FIG. 5 illustrates the dual rotor machine 148 slightly later in the cycle, denoted by the rotation of the input rotor 150 from reference A to reference B. the inner, or output rotor 154 has not significantly changed position.

Stator pole 174 is energized so that the output pole of rotor 154 is still pulled toward the first stator pole 172. Stator pole 200 is also energized. The output pole that is fully aligned with stator pole 200 has no net torque. However, because the stator poles 172 and 200 are energize, the breaking magnetic field connection between the input poles and the stator poles 172 and 200 increases the stored energy in their respective magnetic fields. This increased field at stator pole 172 has a direct impact on the torque of the output rotor and a neutral effect on the output rotor pole aligned with stator pole 200. In both cases, electrical power can be returned to the capacitor 216. In an exemplary embodiment, the output torque imparted to the output rotor 154 can be about 2.2 KNm while the energy returned to the dual rotor machine 148 by the input rotor 150 can be about −4.8 KNm.

This effect is discussed in more detail below, but at a high level, energy from the magnetized input rotor pole builds the magnetic field at the stator pole as it breaks away from the respective stator poles and results in a net increase in energy at the dual rotor machine 148. That energy is then transferred to the output rotor.

Figure 6:
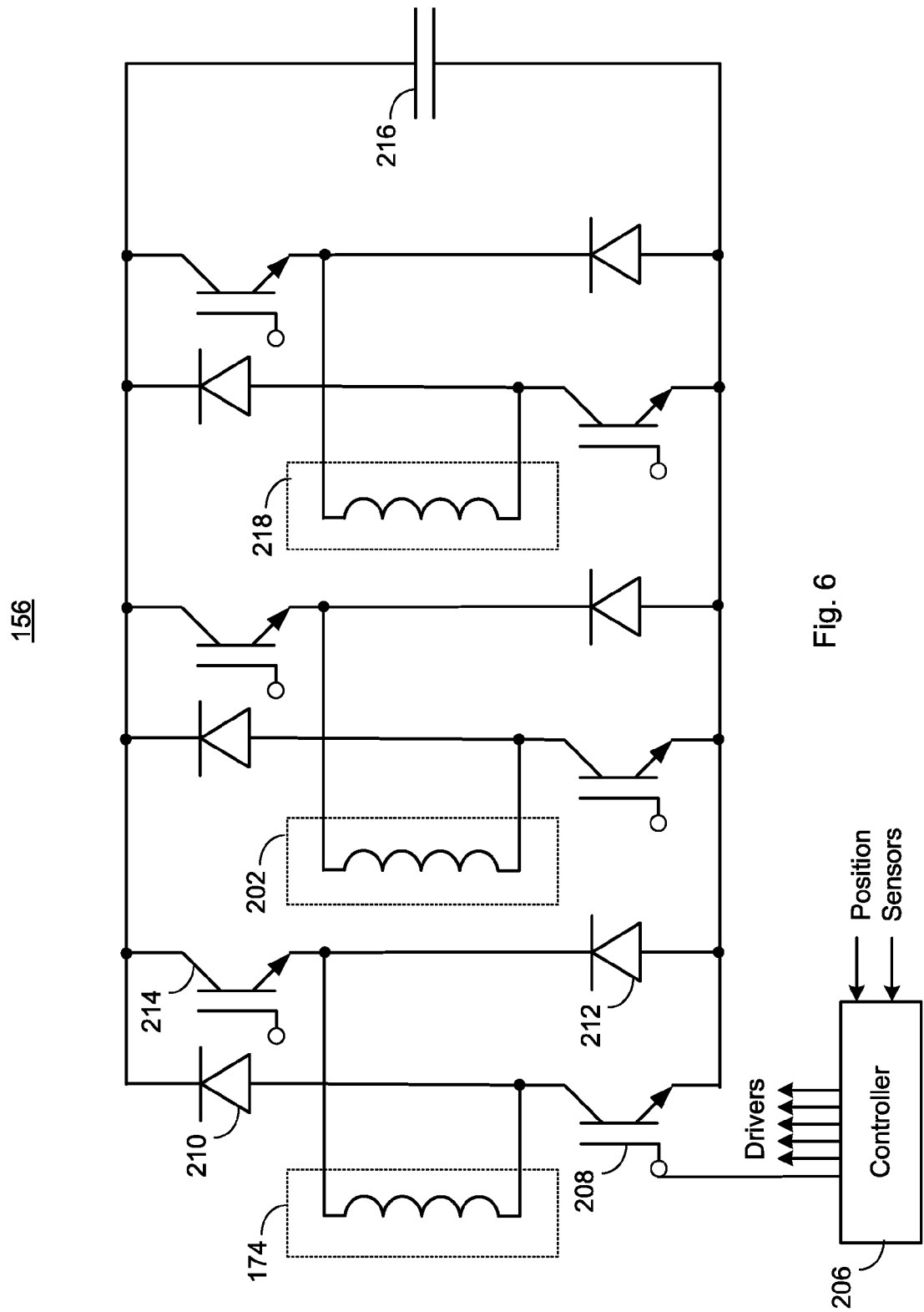
FIG. 6 is a schematic diagram of an embodiment of control electronics.

FIG. 6 illustrates one embodiment of control electronics 156 suitable for use with the dual rotor machine 148 of FIG. 3. Recalling that opposite pairs of stator poles can be operated together, the control electronics includes drivers for three sets of stator pole windings depicted by inductors 174, 202, and 218. Each of the drive circuits are the same and include a low side drive transistor 208 a high side drive transistor 214 and a pair of diodes 210 and 212. A capacitor 216 can be used to store electricity used to drive the stator pole windings and/or filter the DC ripple generated by the dual rotor machine 148. A battery (not depicted) may be connected to the capacitor 216 to supplement the capacitor 216, for example, during startup.

A controller 206 receives position information from position sensors on the input rotor and the output rotor, or corresponding driveshafts. The controller 206 also includes output drivers for each of the paired transistors that drive the stator pole windings. The transistors 208 and 214 can be insulated gate bipolar transistors (IGBT) known for their high current capacity and fast switching speed. In operation, when both transistors 214 and 208 are turned on current flows through winding 174 (and it's paired pole) and builds up a magnetic field. When the transistors 208 and 214 are turned off at an appropriate point during the rotation of the respective rotors 150 and 154, the collapsing magnetic field generates electric current that is transmitted via diodes 212 and 210 back to the capacitor 216.

Compared to a prior art implementation that uses separate AC-DC converters and DC-AC inverters, the current embodiment uses a single converter to receive excess electrical energy from the stator winding 174 as well as to deliver drive current to the stator 174, improving both the cost and reliability of the system because of the decreased number of components.

INDUSTRIAL APPLICABILITY

A dual rotor machine 148 can be employed in any application where power from an engine needs to be converted to drive a vehicle or other mechanical device. The dual rotor machine 148 is particularly well-suited to continuously variable transmission (CVT) applications where a diesel or gasoline engine 142 may be operated at a nearly constant speed to improve its efficiency and the CVT is responsible for drive speed and direction.

Because the input rotor 150 and output rotor 154 share a common stator 152, magnetic energy can be directly transmitted from the input rotor 150 to the output rotor 154 without externally storing electricity as an intermediate step. This eliminates the prior art the requirement that all magnetic energy be converted to AC electrical energy in a generator set, stored or filtered, and converted to DC electrical energy before being applied as magnetic energy in the motor portion of the set.

Further, the use of a shared stator 152 eliminates at least one stator from the hardware associated with separate generator-motor sets, including the windings which are generally made from relatively expensive copper wires. Overall, the sharing of a stator, elimination of the DC-AC inverter, and elimination of the other associated mounting hardware and duplicate control electronics can result in a CVT that may be half the size and weight of a similar horsepower generator-motor set.

Because neither the input rotor nor the output rotor requires windings or permanent magnets for operation, slip rings and expensive magnets can be eliminated, improving both cost and reliability over motor-generator sets or other prior art dual rotor devices.

Figure 7:
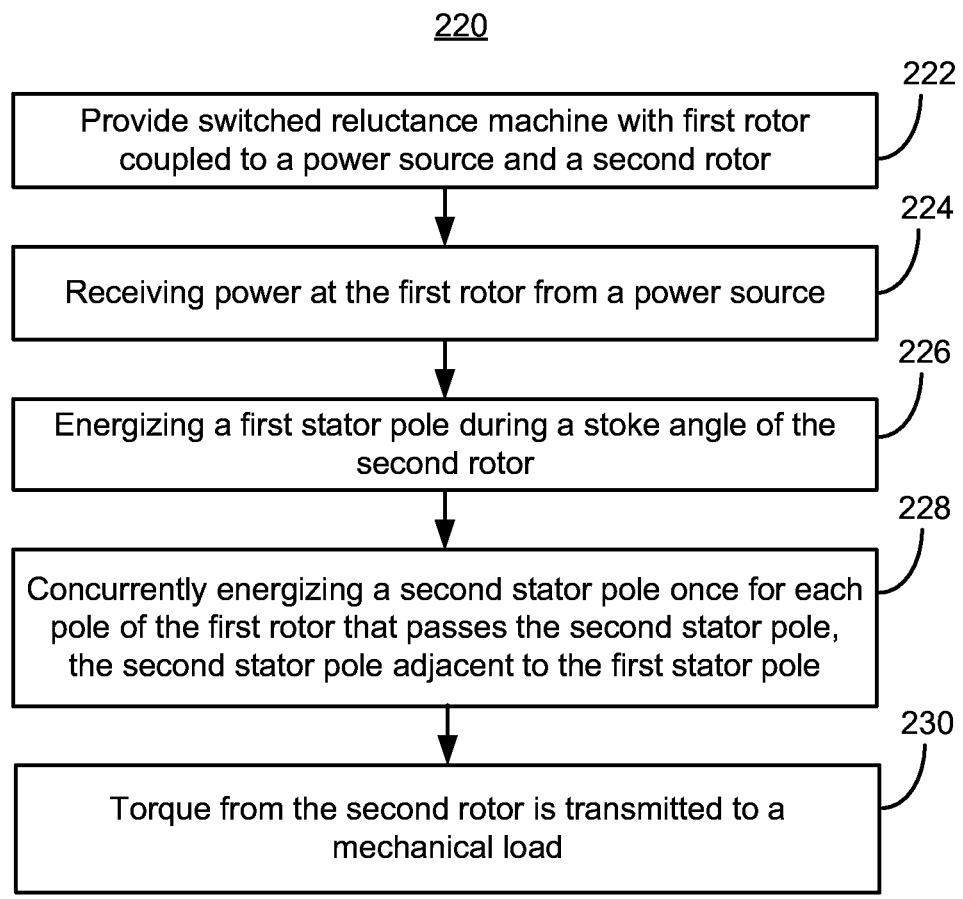
FIG. 7 is a flow chart of a method of operating the dual rotor machine.

FIG. 7 is a flow chart of a method 220 of operating a dual rotor machine 148. At block 222, a switched reluctance machine can be provided with a first rotor 150 and a second rotor 154, each rotor overlapping a common stator 152. The stator 152 may have a cylindrical shape and be fixedly mounted with respect to the first rotor 150 and the second rotor 154. The first rotor 150 may have an integer multiple of poles of both the stator 152 and the second rotor 154. For example, the second rotor 154 can have four poles and the first rotor 150 can have 12 poles in a ratio of 3:1. The stator 152 can have 6 poles with a ratio of 2:1 input poles to stator poles. In an embodiment, The first rotor 150 can have 12 poles, the second rotor 154 can have four poles and the stator 152 can have six poles. Both the first rotor 150 and the second rotor 154 may be free of windings or permanent magnets other than position sensing magnets.

The stator 152 can have poles, e.g., poles 172, 200, extending from an inner circumference to an outer circumference of the cylindrical shape, each stator pole 172, 202 electrically energized with a corresponding, axially opposite stator pole. A vehicle associated with the dual rotor machine 148 may have a gearbox 144 between the power source 142 and the first rotor 150 that maintains a rotational speed of first rotor 150 above a rotational speed of second rotor 154 during operation. While not necessary, there may be advantages to maintaining this speed relationship when convenient so that input rotor poles always have multiple stator pole crossings compared to output rotor poles crossing of a stator pole.

At a block 224, power can be received from the power source at the first rotor 150. For example, the power source may be a diesel or gasoline engine 142 and the first rotor 150 (or input rotor) can be turned by the engine either directly or via a gearbox 144.

At block 226, a first stator pole 172 can be energized during a stoke angle of the second rotor 154. A stoke angle is that range of angles of an output rotor pole 155 over which a particular stator pole can effectively cause motion in a desired direction. Output stoke angle can be calculated as 360 degrees/(output rotor poles*stator phases). In the illustrated embodiment, the six stator poles are paired so that there are 3 stator phases. Therefore, the output stoke angle of the embodiment can be calculated as 360 degrees/(4*3)= 30 degrees.

Referring briefly to FIG. 8, a prior art control diagram 240 for a 6/4 (6 stator poles and 4 rotor poles) switched reluctance motor is shown. The control diagram 240 shows a control signal 242 and corresponding control current 244 (Ia, Ib, Ic) for each stator pole pair. As illustrated, successive stator poles are energized for 30 degrees of mechanical rotation (Ro) of the output rotor 154.

Returning to FIG. 7, at a block 228, concurrent with the energizing of the first stator pole, a second stator pole is energized once for each pole of the first rotor that passes the second stator pole. The second stator pole can be adjacent to the first stator pole. For forward and accelerating operation (Quadrant 1) the second stator pole energized can be adjacent to the first stator pole in a downstream direction of rotation of the first rotor.

Turning briefly to FIG. 9, a control diagram 246 for the dual rotor machine 148 is shown. In order to create the desired motion in the forward (in this case, counterclockwise) direction, the stator poles with respect to the output rotor 150 are excited as shown in FIG. 8. In addition, the adjacent stator pole pair is excited once for each input pole that passes the adjacent stator pole. In the illustration, when the B stator is excited with current Ib, the C stator pole is excited once for each input rotor pole that passes the C stator pole. As discussed above, energizing the stator pole during the overlap of an input rotor pole causes energy from the input rotor 150 to build the magnetic field at the adjacent stator pole when the input pole breaks free of the energized stator pole. This transfers energy from the input rotor to the stator 152 and subsequently to the output rotor. In the illustrated embodiment, during the Ib output rotor phase, the Ic stator pole is pulsed during input rotor pole crossings. Similarly, during the Ia output rotor phase, the Ib stator pole is pulsed; and during the Ic output rotor phase, the Ia stator pole is pulsed.

Returning to FIG. 7, at a block 230 torque from the output rotor (i.e, the second rotor) is transmitted to the mechanical load, such as a wheel or track that drives the vehicle.

Figure 14:
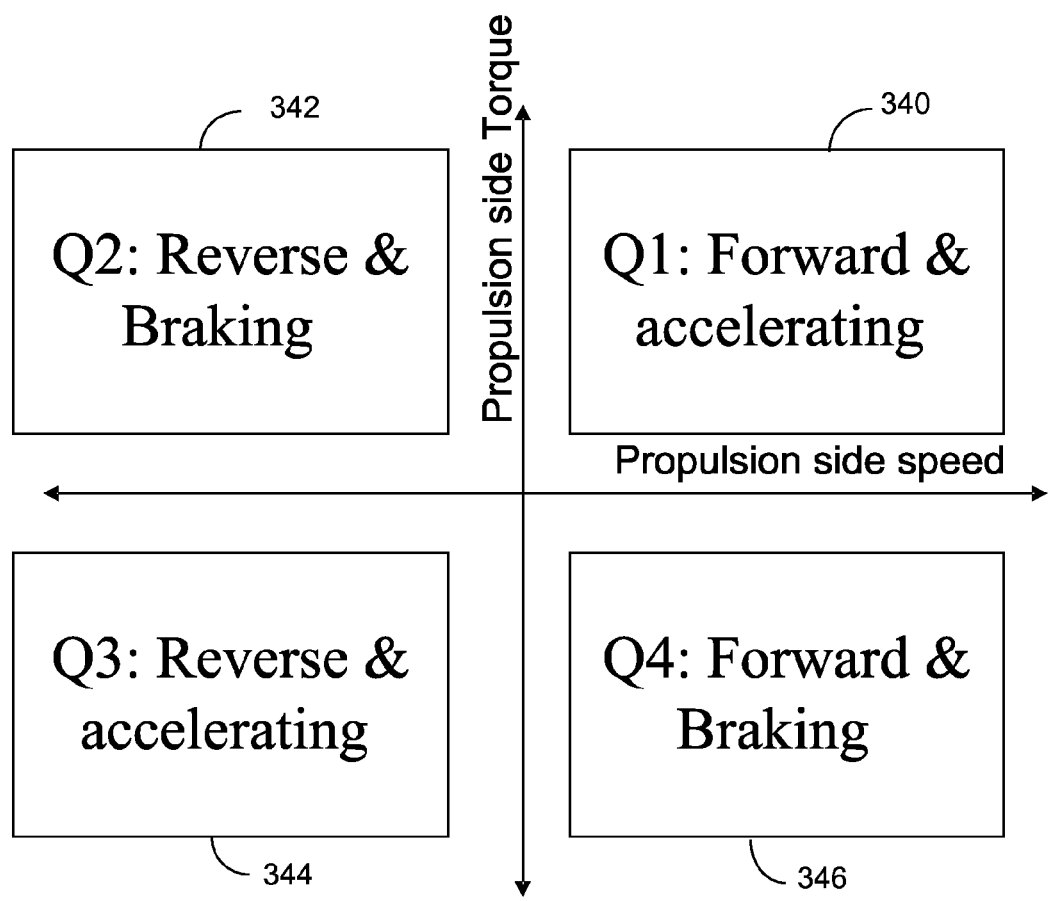
FIG. 14 is a definition of operating regimes a vehicle powered by a dual rotor machine.

FIG. 14 illustrates one definition of operating regimes for a vehicle powered by a dual rotor machine 148 and will be referred to in the following discussion. Quadrant 1 340 is defined as forward and accelerating. Quadrant 2 342 is defined as reverse and braking. Quadrant 3 is defined as reverse and accelerating. Quadrant 4 is defined as forward and braking. As described for quadrants 1 and 2, each quadrant deals with either positive or negative torque between the engine 142 and the dual rotor machine 148 as well as positive or negative torque between the dual rotor machine 148 and the propulsion devices 162.

Figure 10A:
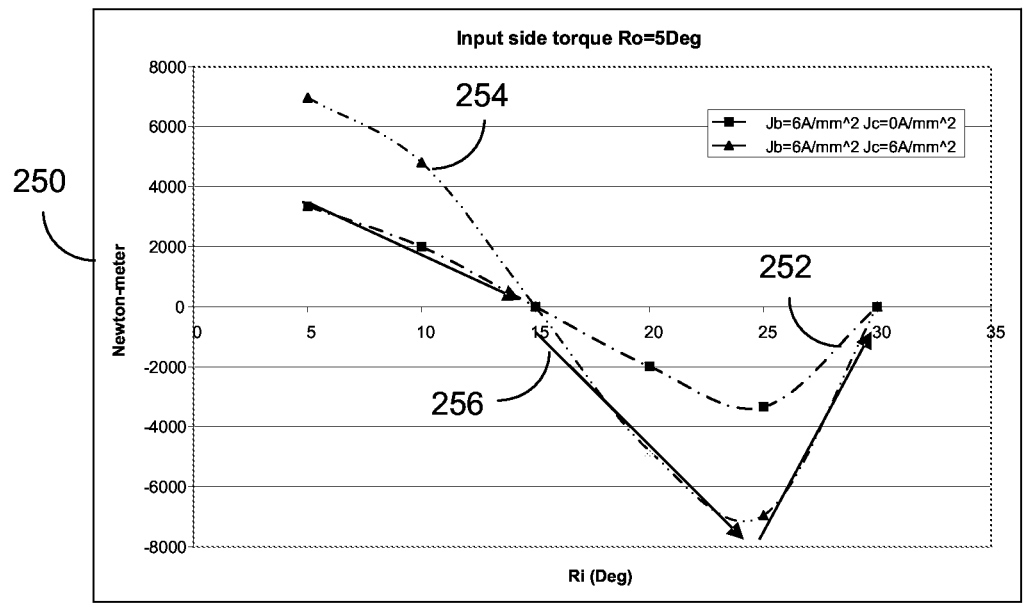
FIGS. 10a-10b are input and output torque diagrams for the dual rotor machine in Quadrant 1 with an output angle of 5 degrees.
Figure 10B:
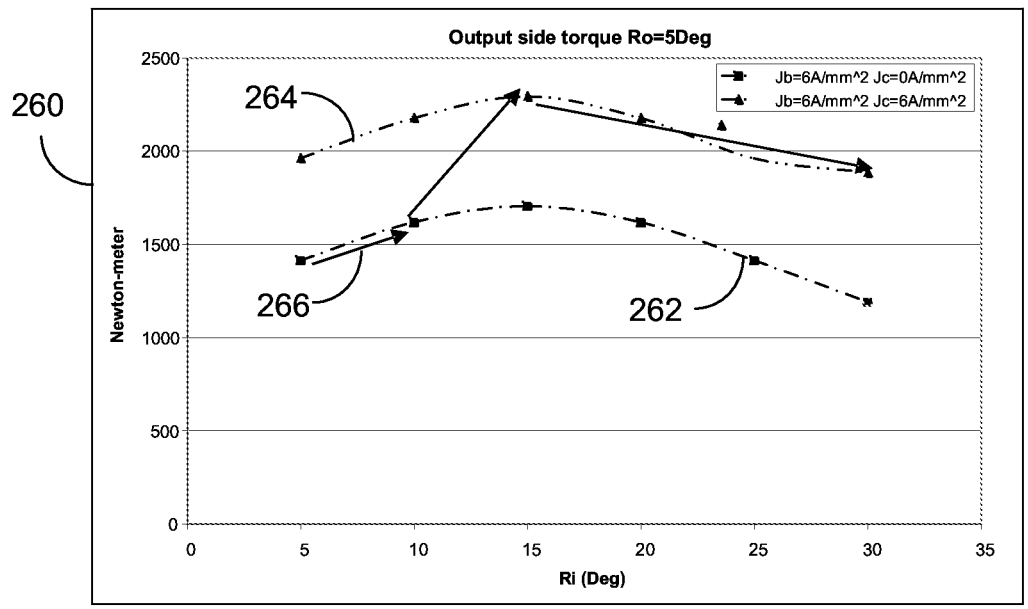

FIGS. 10a and 10b are input and output torque diagrams for the dual rotor machine in Quadrant 1 with a fixed output rotor angle of 5 degrees. In FIG. 10a, a torque diagram 250 shows input side torque over 25 degrees (5 degrees to 30 degrees) of input rotor angle. The torque diagram 250 shows a first torque curve 252 with only one stator pole ("B") energized and a second torque curve 254 with the B stator pole and an adjacent stator pole ("C") active. Referring to Table 1, below, a stator energizing scheme is summarized for Quadrant 1 operation.

TABLE 1

Forward and accelerating (Quadrant 1)

| Engine-side pole pitch (degrees) | Traction side mechanical angle (degrees) Stoke angle = 30 degrees | | | | | |
|---|---|---|---|---|---|---|
| | 5 | 10 | 15 | 20 | 25 | 30 |
| 5 | B | B | B | B | B | B |
| 10 | B | B | B | B | B | B |
| 15 | B & C | B & C | B & C | B & C | B & C | B & C |
| 20 | B & C | B & C | B & C | B & C | B & C | B & C |
| 25 | B & C | B & C | B & C | B & C | B & C | B & C |
| 30 | B & C | B & C | B & C | B & C | B & C | B & C |

The output rotor angle of 5 degrees is highlighted in the first column of Table 1 corresponding to the fixed output rotor angle illustrated in FIGS. 10a and 10b. Following the column down at 5 and 10 degrees, only the B stator is energized and the actual torque at the input will follow curve 252. At 15 degrees, the C stator is also energized and the actual torque will follow line 254 from 15 degrees to 30 degrees. Solid reference lines 256 track the torque path.

Figure 11A:
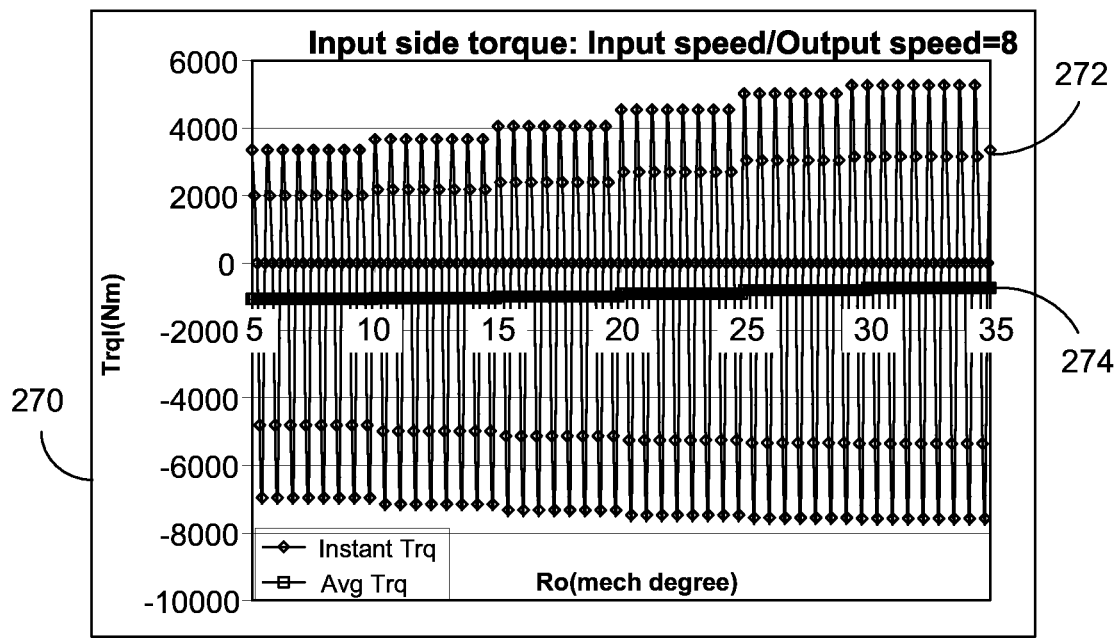
FIGS. 11a-11b are instantaneous torque input and output charts for Quadrant 1 operation of the dual rotor machine.

Referring briefly to FIG. 11a, input torque diagram 270 illustrates instantaneous input torque 272 over a range of output rotor angles, beyond the fixed angle of FIG. 10a. The average input torque 274 is negative, showing that power from the engine 142 is converted to torque at the dual rotor machine 148.

Turning to FIG. 10b, an output torque diagram 260 for the same fixed output rotor angle of 5 degrees shows output torque as a function of input rotor angle. A first torque curve 262 shows torque with only the B stator pole energized. The second torque curve 264 shows torque with both the B and C stator poles energized. Again referring to Table 1, the actual torque follows solid lines 266 as the B stator pole is energized from 5 to 10 degrees and the B and C stator poles are energized from 15 degrees to 30 degrees.

Figure 11B:
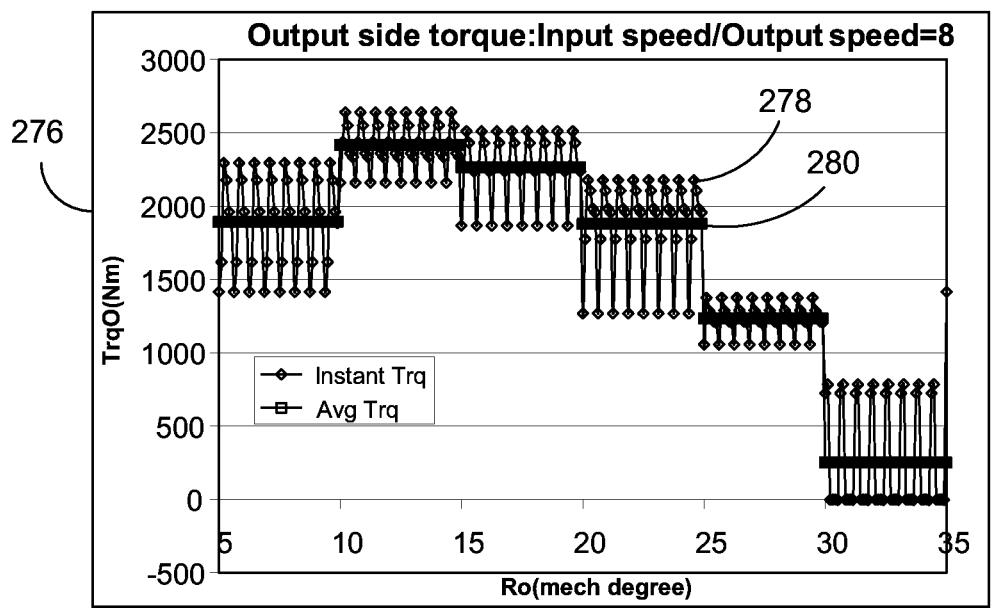

Referring to FIG. 11b, chart 276 illustrates instantaneous output rotor torque 278 and average output rotor torque 280. As can be seen, all the average output rotor torque values 280 are positive, indicating positive (in this case, forward) torque is being generated. FIGS. 10a, 10b, 11a, and 11b demonstrate operation where power from the engine 142 is captured at the dual rotor machine 148 and positive torque is generated at the output.

While operation in each quadrant will not be discussed in detail, the following figures illustrate operation in Quadrant 2, reverse and braking.

Figure 12A:
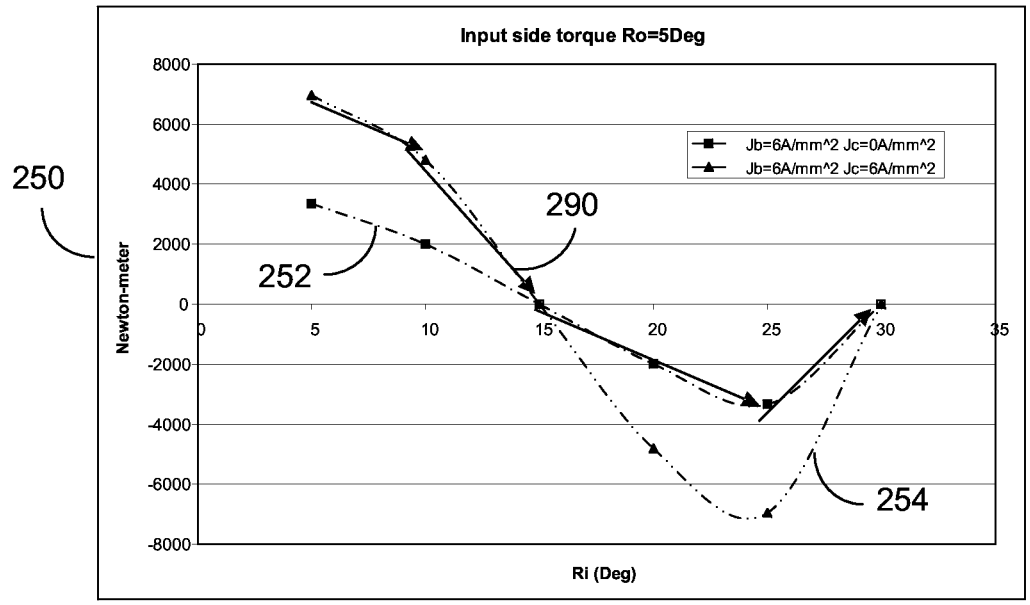
FIGS. 12a-12b are input and output torque diagrams for the dual rotor machine in Quadrant 4 with an output angle of 5 degrees.

FIG. 12a shows another instance of the input torque diagram 250 of FIG. 10a, with B stator pole only curve 252 and B and C stator pole curve 254. However, referring to Table 2, below, use of a different excitation pattern causes different torque profiles to be generated. From 5 degrees to 15 degrees, both the B and C stator poles are energized, from 20 to 25 degrees only the B stator pole is energized, and at 30 degrees, again both the B and C stator poles are energized.

TABLE 2

Reverse and Braking (Quadrant 4)

| Engine-side pole pitch (degrees) | Traction side mechanical angle (degrees) Stoke angle = 30 degrees | | | | | |
|---|---|---|---|---|---|---|
| | 5 | 10 | 15 | 20 | 25 | 30 |
| 5 | B & C | B & C | B & C | B & C | B & C | B & C |
| 10 | B & C | B & C | B & C | B & C | B & C | B & C |
| 15 | B & C | B & C | B & C | B & C | B & C | B & C |
| 20 | B | B | B | B | B | B |
| 25 | B | B | B | B | B | B |
| 30 | B & C | B & C | B & C | B & C | B & C | B & C |

Figure 13A:
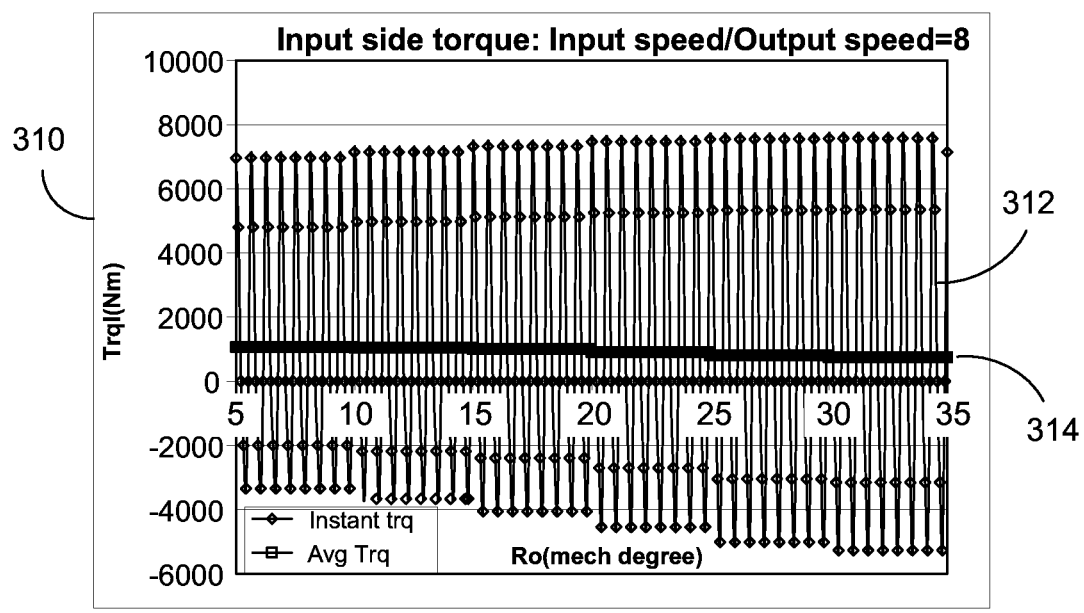
FIGS. 13a-13b are instantaneous torque input and output charts for Quadrant 4 operation of the dual rotor machine.

Referring to FIG. 13a, a torque diagram 310 shows instantaneous torque 312 as a function of output rotor angle for Quadrant 4 operation. The average torque 314 is positive, meaning that torque is being returned to the engine in a form of engine braking.

Figure 12B:
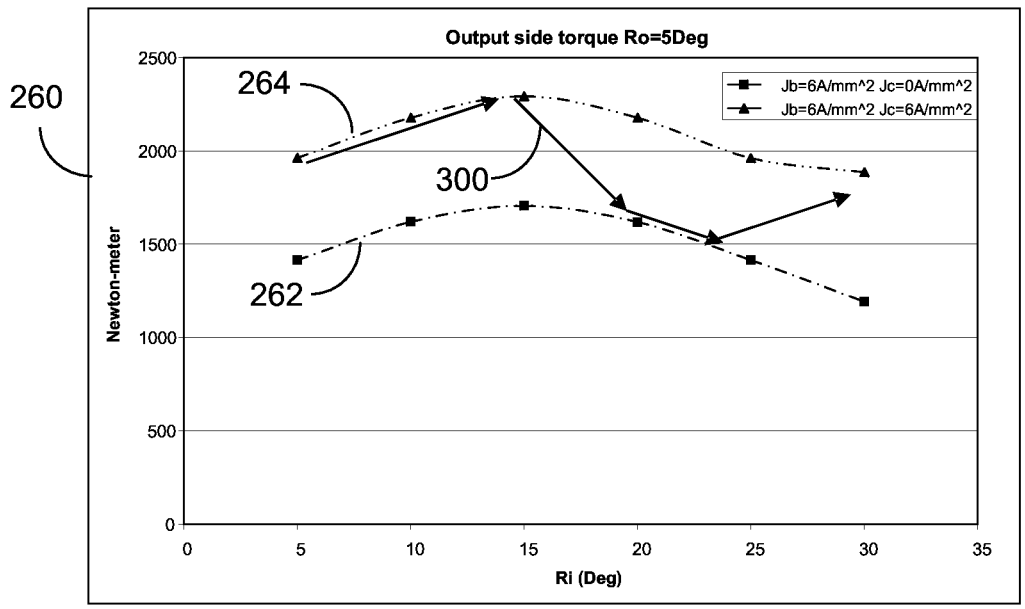

Similarly, FIG. 12b shows another instance of the output rotor torque diagram 260 with B stator pole torque curve 262 and B and C stator pole torque curve 264 for an output rotor angle of 5 degrees. Using the energizing pattern highlighted in Table 2, the actual output torque follows solid lines 300 as the energizing scheme is implemented over the increasing input rotor angles.

Figure 13B:
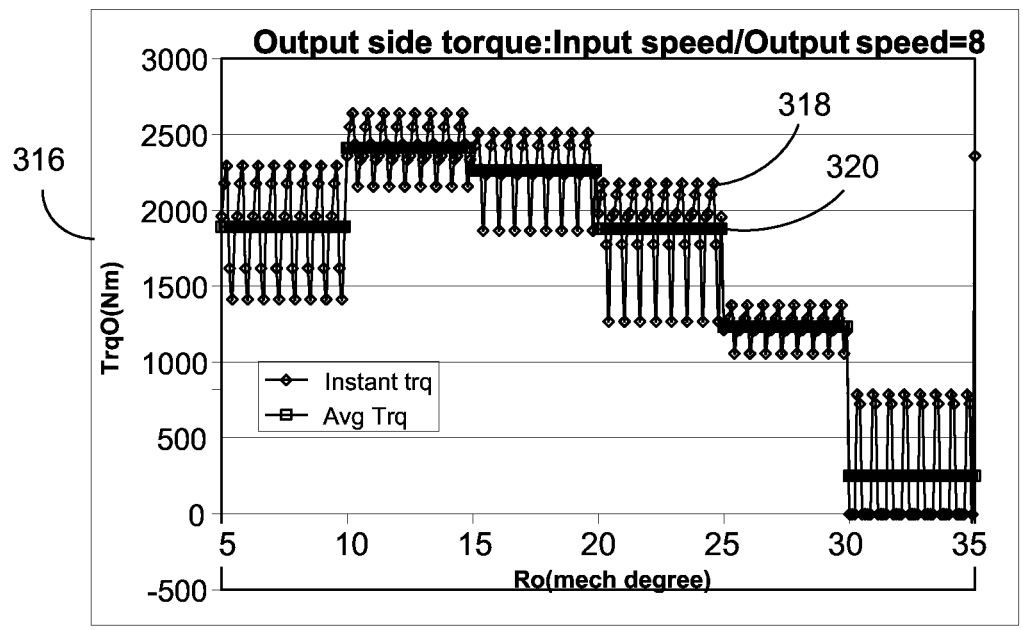

FIG. 13b shows a torque diagram 316 with instantaneous output torque 318 as a function of output rotor angle. The average power is signified by each solid bar 320. FIGS. 12a, 12b, 13a, and 13b demonstrate operation where power from the propulsion device 162 (e.g., tires) is captured at the dual rotor machine while the vehicle is in reverse and braking. In turn, the dual rotor machine 148 transmits positive torque to the engine, causing the engine to attempt to increase in speed.

Operation in Quadrants 3 and 4 are similarly embodied by selecting stator pole activation sequences to positive or negative input torque and positive or negative output torque. The variations in torque shown in FIGS. 11a, 11b and 13a, 13b is called torque jitter and is a known side effect in switched reluctance motors and generators. The mass of the input rotor 150 and output rotor 154 provides a certain flywheel effect and can smooth torque jitter. In some embodiments, the moment of inertia of the input rotor 150 is greater than that of the output rotor, providing engine-side inertia while allowing the output rotor to be more responsive to changes in speed and/or direction.

What is claimed is:

1. An energy conversion machine comprising:
   the energy conversion machine comprising a dual rotor switched reluctance machine including a stator, an input rotor, an output rotor, and a single converter;
   the stator having a cylindrical shape with an inner circumference and an outer circumference, the stator fixedly mounted and having poles, each pole having an electrical winding and extending radially from the inner circumference of the cylindrical shape of the stator to the outer circumference of the cylindrical shape of the stator;
   the input rotor rotatably mounted adjacent to one circumference of the stator, the input rotor free of both windings and permanent magnets and coupled to a first driveshaft configured to transmit power between the input rotor and a power source;
   the output rotor rotatably mounted adjacent to the other circumference of the stator, the output rotor free of both windings and permanent magnets and coupled to a second driveshaft configured to transmit torque between a mechanical load and the output rotor;
   the single converter including control electronics coupled to the electrical winding of each pole and a controller, the control electronics including a transistor pair for each stator phase that captures electrical energy generated by the input rotor and delivers electrical energy to the output rotor, each stator phase including two stator poles; and
   wherein the controller selectively energizes the stator electrical windings of one or more stator poles extending between the input rotor and the output rotor to transfer electrical energy and torque developed between the input rotor and the stator directly to the output rotor without externally storing or converting electrical energy separate from the single converter.

2. The energy conversion machine of claim 1, wherein the input rotor includes a plurality of input rotor poles, and wherein the controller energizes a first stator pole, and with the first stator pole energized, the controller energizes an adjacent second stator pole once for each of the input rotor poles that pass the second stator pole such that a breaking magnetic field connection between the input rotor poles and the first and second stator pole builds electrical energy within a magnetic field developed at the stator and the magnetic field creates electrical energy and torque which is delivered directly from the stator to at the output rotor.

3. The energy conversion machine of claim 2, wherein the input rotor has an integer multiple of poles compared to a number of stator poles and the output rotor has a fractional multiple of poles compared to the number of stator poles.

4. The energy conversion machine of claim 3, wherein the input rotor has 12 poles, the stator has 6 poles, and the output rotor has 4 poles.

5. The energy conversion machine of claim 2, wherein the input rotor is mounted around the outer circumference of the stator and the output rotor is mounted proximate the inner circumference of the stator.

6. The energy conversion machine of claim 1, wherein the controller energizes a first stator pole throughout an angular displacement of an output stoke angle of the output rotor and concurrently energizes a second stator pole adjacent to the first stator pole each time an input rotor pole passes the second stator pole.

7. The energy conversion machine of claim 6, wherein the input rotor operates at a higher angular velocity than the output rotor and the input rotor has a higher number of poles than the output rotor so that multiple input rotor poles pass the second stator pole during an energized period of the first stator pole.

8. The energy conversion machine of claim 1, wherein the input rotor has a larger moment of inertia than the output rotor.

9. A method of converting energy from a power source to a mechanical load comprising:
provinding a switched reluctance machine with a first rotor free of both windings and permanent magnets, a second rotor free of both windings and permanent magnets, a single converter, and a stator, the stator fixedly mounted with respect to the first rotor and the second rotor and the stator having a cylindrical shape and poles extending from an inner circumference of the cylindrical shape of the stator to an outer circumference of the cylindrical shape of the stator, each stator pole having an electrical winding and electrically energized with a corresponding, axially opposite stator pole;
providing the first rotor and the second rotor overlapping the stator, and mounting the first rotor adjacent to one of the inner circumference and the outer circumference of the stator, and mounting the second rotor adjacent to the other of the inner circumference and the outer circumference of the stator;
providing the stator with a plurality of phases, each phase including two stator poles;
providing the single converter, the single converter including control electronics coupled to the electrical winding of each stator pole and a controller, the control electronics including a transistor pair for each stator phase that captures electrical energy generated by the first rotor and delivers electrical energy to the second rotor;
receiving power from the power source at the first rotor via a first driveshaft coupled to the first rotor;
energizing, via the controller, the electrical windings of a first stator pole extending between the input rotor and the output rotor during a stoke angle of the second rotor;
concurrent with the energizing of the first stator pole, the controller energizing the electrical windings of a second stator pole extending between the input rotor and the output rotor once for each pole of the first rotor that passes the second stator pole, the second stator pole adjacent to the first stator pole; and
transferring electrical energy and torque developed between the first rotor and the stator directly to the second rotor without externally storing or converting electrical energy separate from the single converter; and
transmitting torque transferred to the second rotor to the mechanical load via a second driveshaft coupled to the second rotor.

10. The method of claim 9, wherein providing the switched reluctance machine comprises:
providing the first rotor having an integer multiple of poles of the stator; and
providing the stator having more poles than the second rotor and fewer poles than the first rotor.

11. The method of claim 9, wherein energizing the second stator pole comprises energizing the second stator pole that is adjacent to the first stator pole in a direction of rotation of the first rotor.

12. The method of claim 9, wherein providing the switched reluctance machine comprises:
providing the first rotor with 12 poles, the second rotor with 4 poles and the stator with 6 poles, the first rotor and the second rotor both free of windings or permanent magnets.

13. A system for propelling a vehicle comprising:
an engine;
an energy conversion machine, the energy conversion machine comprising a dual rotor switched reluctance machine having an input rotor coupled to the engine, an output rotor, a stator, and a single converter;
the stator having a cylindrical shape with an inner circumference and an outer circumference, the stator fixedly mounted and having stator poles, each stator pole having an electrical winding and extending radially from the inner circumference of the cylindrical shape of the stator to the outer circumference of the cylindrical shape of the stator;
the input rotor rotatably mounted radially adjacent to one circumference of the stator, the input rotor free of windings and permanent magnets, the input rotor coupled to a first driveshaft configured to transmit power between the input rotor and the engine;
the output rotor rotatably mounted radially adjacent to the other circumference of the stator, the output rotor free of windings and permanent magnets;
the single converter including control electronics coupled to the electrical winding of each stator pole and a controller, the control electronics including a transistor pair for each stator phase that captures electrical energy generated by the input rotor and delivers electrical energy to the output rotor, each stator phase including two stator poles;
wherein the controller selectively energizes the stator electrical windings of one or more stator poles extending between the input rotor and the output rotor to transfer electrical energy and torque developed between the input rotor and the stator directly to the output rotor without externally storing or converting electrical energy separate from the single converter;

a second driveshaft coupled to the output rotor; and a propulsion device that converts torque from the output rotor received via the second driveshaft to propel the vehicle.

14. The system of claim 13, wherein the stator, the input rotor and the output rotor are axially aligned around a central axis of the output rotor.

15. The system of claim 13, wherein the engine is a diesel engine operated at a substantially constant speed.

16. The system of claim 13 further comprising a gearbox between the engine and the input rotor that increases an output speed of the engine at the input rotor.

17. The system of claim 13, wherein the controller of the energy conversion machine comprises a plurality of position sensor inputs and selectively energizes the stator poles according to a position of the input rotor and the output rotor.

18. The system of claim 17, wherein the energy conversion machine further comprises at least one position sensor for each of the input rotor and the output rotor that reports an angular attitude of its respective rotor and reports the position to the controller for use in selectively energizing the stator poles.

* * * * *